(12) United States Patent
Hsu et al.

(10) Patent No.: US 10,503,653 B2
(45) Date of Patent: Dec. 10, 2019

(54) MEMORY SYSTEM

(71) Applicant: Toshiba Memory Corporation, Minato-ku (JP)

(72) Inventors: Lanyin Hsu, Yokohama (JP); Naomi Takeda, Yokohama (JP); Hiroshi Yao, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 149 days.

(21) Appl. No.: 15/064,772

(22) Filed: Mar. 9, 2016

(65) Prior Publication Data

US 2017/0075811 A1  Mar. 16, 2017

Related U.S. Application Data

(60) Provisional application No. 62/217,379, filed on Sep. 11, 2015.

(51) Int. Cl.
*G06F 12/0888* (2016.01)
*G06F 3/06* (2006.01)

(52) U.S. Cl.
CPC ........ *G06F 12/0888* (2013.01); *G06F 3/0604* (2013.01); *G06F 3/064* (2013.01); *G06F 3/0659* (2013.01); *G06F 3/0685* (2013.01); *G06F 2212/604* (2013.01)

(58) Field of Classification Search
CPC ... G06F 3/068; G06F 3/0685; G06F 12/00–16
See application file for complete search history.

(56) References Cited

U.S. PATENT DOCUMENTS

| | | | |
|---|---|---|---|
| 8,896,953 B2 | 11/2014 | Haga et al. | |
| 9,026,764 B2 | 5/2015 | Hashimoto | |
| 2008/0235477 A1* | 9/2008 | Rawson | G06F 12/0284 711/165 |
| 2011/0252201 A1* | 10/2011 | Koren | G06F 11/1448 711/135 |
| 2012/0054421 A1 | 3/2012 | Hiratsuka et al. | |
| 2014/0189217 A1* | 7/2014 | Marukame | G06F 3/0679 711/103 |
| 2014/0195749 A1* | 7/2014 | Colgrove | G06F 3/0619 711/159 |
| 2015/0058935 A1* | 2/2015 | Tolia | H04L 63/08 726/4 |
| 2016/0147443 A1* | 5/2016 | van Riel | G06F 3/061 711/103 |
| 2016/0259571 A1* | 9/2016 | Kumasawa | G06F 3/06 |

* cited by examiner

*Primary Examiner* — Nicholas J Simonetti
(74) *Attorney, Agent, or Firm* — Oblon, McClelland, Maier & Neustadt, L.L.P.

(57) ABSTRACT

According to one embodiment, a controller transmits a response to a write request to a host before executing matching between first management information and second management information.

16 Claims, 12 Drawing Sheets

FIG.4

| LOGICAL ADDRESS | PHYSICAL ADDRESS | Valid |
|---|---|---|
| 0 | | 1 |
| | | 0 |
| ⋮ | ⋮ | ⋮ |
| | | 1 |
| | | 1 |
| | | 0 |
| ⋮ | ⋮ | ⋮ |
| | | 1 |
| ⋮ | ⋮ | ⋮ |

MEMORY SYSTEM

CROSS-REFERENCE TO RELATED APPLICATIONS

This application is based upon and claims the benefit of priority from U.S. Provisional Application No. 62/217,379, filed on Sep. 11, 2015; the entire contents of which are incorporated herein by reference.

FIELD

Embodiments described herein relate generally to a memory system including nonvolatile memory.

BACKGROUND

In a storage device including semiconductor memory such as NAND type flash memory, there are cases where nonvolatile cache memory is included.

BRIEF DESCRIPTION OF THE DRAWINGS

FIG. 4 is a diagram that illustrates an L2P table;

DETAILED DESCRIPTION

According to one embodiment, a memory system includes: first nonvolatile memory; second nonvolatile memory; and a controller. The second nonvolatile memory has a less storage capacity and a smaller latency than the first nonvolatile memory. In a case where a size of the first data specified by a write request from a host is more than a first threshold, the controller stores first data in the first nonvolatile memory and generates first management information representing a correspondence relation between a logical address of the specified first data and a physical address of the first nonvolatile memory. In a case where the size of the first data is less than the first threshold, the controller stores the first data in the second nonvolatile memory and generates second management information representing a correspondence relation between the logical address of the specified first data and a physical address of the second nonvolatile memory. The controller transmits a response to the write request to the host before executing matching between the first management information and the second management information.

Exemplary embodiments of memory systems will be explained below in detail with reference to the accompanying drawings. The present invention is not limited to the following embodiments.

First Embodiment

Figure 1:
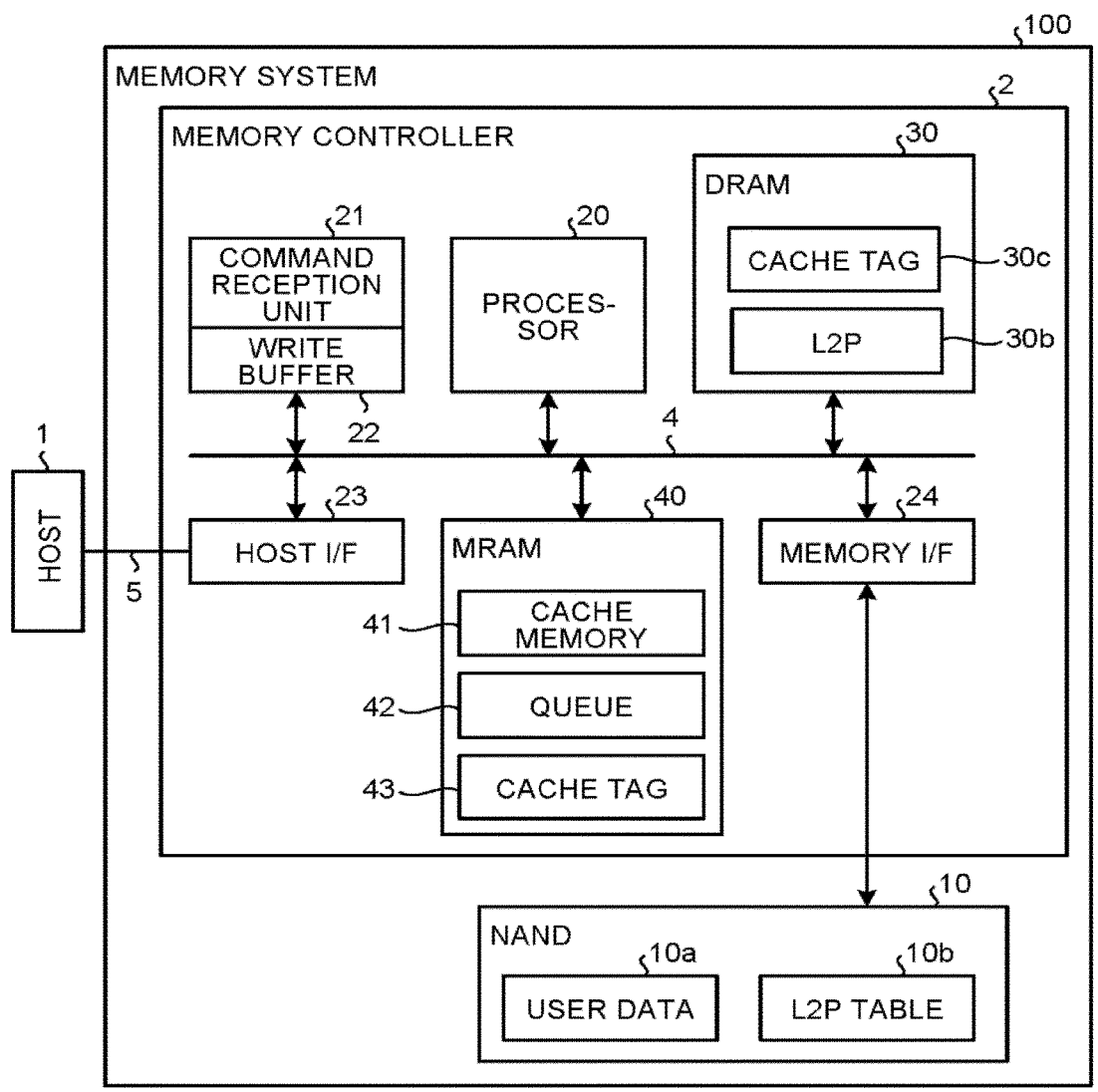
FIG. 1 is a functional block diagram that illustrates the internal configuration of a memory system according to a first embodiment.

FIG. 1 is a block diagram that illustrates an example of the configuration of a memory system 100 according to a first embodiment. The memory system 100 is connected to a host apparatus (hereinafter, abbreviated as a host) 1 through a communication line 5 and functions as an external storage device of the host 1. The host 1, for example, may be an information processing apparatus such as a personal computer, a mobile phone, or an imaging apparatus, may be a mobile terminal such as a tablet computer or a smart phone, a gaming device, or an in-vehicle terminal such as a car navigation system.

The memory system 100 includes: NAND type flash memory (hereinafter, abbreviated as NAND) 10 as first nonvolatile memory; and a memory controller 2. The first nonvolatile memory device is not limited to the NAND type flash memory but may be flash memory having a three-dimensional structure, a hard disk, or the like.

The NAND 10 includes one or more memory chips each including a memory cell array. The memory cell array includes a plurality of memory cells arranged in a matrix pattern. The memory cell array includes a plurality of blocks that are units for data erasing. Each block is configured by a plurality of physical sectors MS (see FIG. 2).

Figure 2:
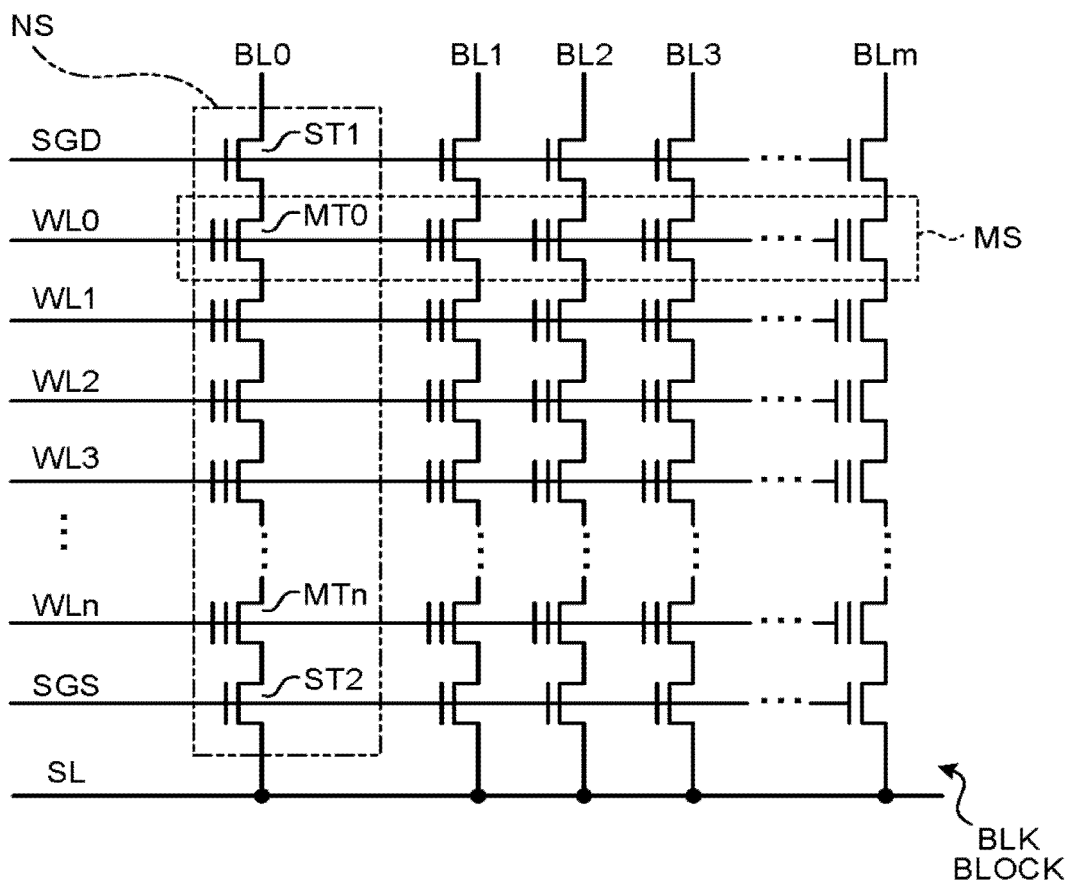
FIG. 2 is a diagram that illustrates an example of the configuration of a block of a memory cell array having a two-dimensional structure.

The memory cell array that is the premise of this embodiment is not particularly limited to a specific configuration but may be a memory cell array having a two-dimensional structure as illustrated in FIG. 2 or a memory cell array having a three-dimensional structure or may employ any other configuration.

FIG. 2 is a diagram that illustrates an example of the configuration of a block of the memory cell array having a two-dimensional structure. FIG. 2 illustrates one of a plurality of blocks that configure the memory cell array having the two-dimensional structure. The other blocks of the memory cell array have the same configuration as that illustrated in FIG. 2. As illustrated in FIG. 2, the block BLK of the memory cell array includes (m+1) (here, m is an integer of "0" or more) NAND strings NS. Each NAND string NS shares a diffusion region (a source region or a drain region) between memory cell transistors MT adjacent to each other. Each NAND string NS includes: (n+1) (here, n is an integer of "0" or more) memory cell transistors MT0 to MTn connected in series; and selection transistors ST1 and ST2 arranged at both ends of the column of the (n+1) memory cell transistors MT0 to MTn.

Word lines WL0 to WLn are respectively connected to control gate electrodes of the memory cell transistors MT0 to MTn that configure the NAND string NS, and, memory cell transistors MTi (here, i=0 to n) included in each NAND string NS are connected to be common using the same word line WLi (here, i=0 to n). In other words, the control gate electrodes of the memory cell transistors MTi disposed in the same row within the block BLK are connected to the same word line WLi.

Each of the memory cell transistors MT0 to MTn is configured by a field effect transistor having a stacked gate structure on a semiconductor substrate. Here, the stacked gate structure includes: a charge storage layer (floating gate electrode) formed on the semiconductor substrate with a gate insulating film being interposed therebetween; and a control gate electrode formed on the charge storage layer with an inter-gate insulating film being interposed therebetween. A threshold voltage of each of the memory cell transistors MT0 to MTn changes according to the number of electrons storable in the floating gate electrode and thus, can store data according to a difference in the threshold voltage.

Bit lines BL0 to BLm are respectively connected to the drains of (m+1) selection transistors ST1 within one block BLK, and a selection gate line SGD is connected to be common to the gates of the selection transistors. In addition, the source of the selection transistor ST1 is connected to the drain of the memory cell transistor MT0. Similarly, a source line SL is connected to be common to the sources of the (m+1) selection transistors ST2 within one block BLK, and a selection gate line SGS is connected to be common to the gates of the selection transistors. In addition, the drain of the selection transistor ST2 is connected to the source of the memory cell transistor MTn.

Each memory cell is connected not only to the word line but also to the bit line. Each memory cell can be identified by using an address used for identifying a word line and an address used for identifying a bit line. As described above, the data of the plurality of memory cells (the memory cell transistors MT) disposed within the same block BLK is erased altogether. On the other hand, data is written and read in units of physical sectors MS. One physical sector MS includes a plurality of memory cells connected to one word line.

Each memory cell can perform multi-value storage. In a case where the memory cells are operated in a single level cell (SLC) mode, one physical sector MS corresponds to one page. On the other hand, in a case where the memory cells are operated in a multiple level cell (MLC) mode, one physical sector MS corresponds to N pages (here, N is a natural number of two or more). In descriptions presented here, the term MLC mode is assumed to include a triple level cell (TLC) mode of N=3. A page is a unit for data reading and data writing.

In a read operation and a program operation, one word line is selected according to the physical address, and one physical sector MS is selected. A switching of the page within this physical sector MS is performed using the physical address.

In the example illustrated in FIG. 1, in the NAND 10, user data 10a transmitted from the host 1, management information of the memory system 100, firmware (not illustrated in the drawing), and the like are stored. The firmware operates a processor 20 of the memory controller 2. The firmware may be stored in ROM not illustrated in the drawing. The management information includes a logical/physical translation table (L2P table) 10b, a block management table (not illustrated in the drawing), and the like.

The memory controller 2 includes: a processor 20; a command reception unit 21; a write buffer 22; a host interface 23; a memory interface 24, DRAM 30, and magnetoresistive random access memory (MRAM) 40. In this embodiment, while the DRAM 30 and the MRAM 40 are arranged inside the memory controller 2, the DRAM 30 and/or the MRAM 40 may be arranged outside the memory controller 2. The host I/F 23 outputs a command, user data (write data), and the like received from the host 1 to an internal bus 4. In addition, the host I/F 23 transmits user data read from the NAND 10, a response of the processor 20, and the like to the host 1. The memory I/F 24 directly controls the NAND 10 based on an instruction from the processor 20.

The command reception unit 21 receives a command transmitted from the host I/F 23 and outputs the received command to the processor 20. The command reception unit 21 includes a write buffer 22. The write buffer 22 buffers write data, which is transmitted from the host 1, received by the host I/F 23. The write buffer 22 is configured by an arbitrary volatile memory that can be accessed at a speed higher than the access speed of the NAND 10. The write buffer 22 may be arranged in the DRAM 30.

The dynamic random access memory (DRAM) 30 is volatile semiconductor memory that can be accessed at a speed higher than the access speed of the NAND 10. The management information stored in the NAND 10 is loaded into the DRAM 30. The management information loaded into the DRAM 30 is backed up by the NAND 10. In FIG. 1, as a part of the management information, an L2P table 30b is illustrated. In addition, a cache tag 43 that is one of the management information stored in the MRAM 40 to be described later is also loaded into the DRAM 30 as a cache tag 30c. The cache tag 30c is backed up in the MRAM 40 as a cache tag 43. The DRAM 30 functions as a buffer in which firmware stored in the NAND 10 is loaded. Other than the DRAM, static random access memory (SRAM) may be used.

The MRAM 40 as a second nonvolatile memory is a nonvolatile semiconductor memory that can be accessed at a speed higher than the access speed of the NAND 10 as the first nonvolatile memory. The storage capacity of the MRAM 40 is less than that of the NAND 10. In addition, the storage capacity of the MRAM 40 is less than that of the DRAM 30. For example, the MRAM 40 has a smaller latency than the NAND 10 and is capable of random access. In addition, the MRAM 40 has a more allowed data rewritable number of times than the NAND 10. The MRAM 40 includes: cache memory 41 buffering write data transmitted from the host 1; a queue 42 in which a certain number of logical addresses of write data buffered in the cache memory 41 are queued; and the cache tag 43. As the second nonvolatile memory, instead of the MRAM 40, resistance random access memory (ReRAM) or ferroelectric random access memory (FeRAM) may be used.

Figure 3:
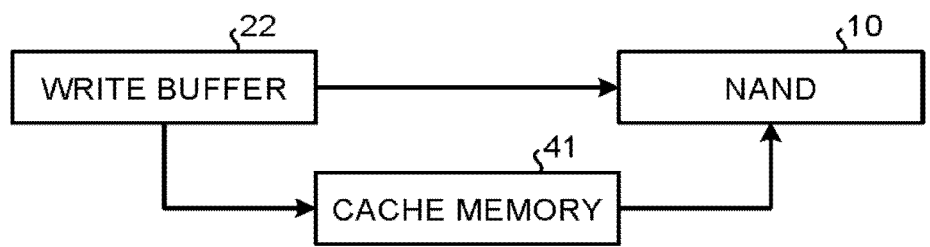
FIG. 3 is a diagram that illustrates the flow of data at the time of reception of a write request inside the memory system according to the first embodiment.

The processor 20 integrally controls the components of the memory system 100. The processor 20 executes a process according to a command received from the host 1. FIG. 3 is a diagram that illustrates the flow of data at the time of reception of a write request. When a write request is received from the host 1, the processor 20 buffers write data into the write buffer 22. For example, when the write buffer 22 is full, the processor 20 reads data stored in the write buffer 22 and writes the read data into one of the cache memory 41 of the MRAM 40 and the NAND 10. When the size of the write data specified by the write request is a threshold Th1 or more, the processor 20 writes the write data into the NAND 10. On the other hand, when the size of the write data is less than the threshold Th1, the processor 20 writes the writes data into the cache memory 41. In addition, when a certain flush condition such as the cache memory 41 being full of data or the like is satisfied, the processor 20 writes the data stored in the cache memory 41 into the NAND 10. As the flush condition, another condition may be used. For example, in a case where the cache memory 41 of an n-way set associative system is used, when the final way is used, the flush condition may be satisfied.

When a read request is received from the host 1, the processor 20 determines the physical address of the cache memory 41 and the NAND 10 in which data corresponding to a logical address specified by the read request is stored and reads data from the determined physical address. In a case where the data is stored in the NAND 10, the processor 20 instructs the memory I/F 24 of the read physical address. The memory I/F 24 buffers the data read from the NAND 10 into a read buffer (not illustrated) of the command reception unit 21. On the other hand, in a case where the data is stored in the cache memory 41, the processor 20 reads the data from the cache memory 41 and buffers the read data into the read buffer (not illustrated) of the command reception unit 21. The processor 20 transmits the read data buffered in the write buffer 22 to the host 1 through the host I/F 23.

The processor 20 manages the user data stored in the NAND 10 by using the L2P table 30b that is one of the management information loaded into the DRAM 30. In the L2P table 30b, mapping associating a logical address used by the host 1 with a physical address of the NAND 10 is registered. As the logical address, for example, a logical block addressing (LBA) is used. The physical address represents a storage location on the NAND 10 at which data is stored. FIG. 4 is a diagram that illustrates an example of the L2P table 30b. As illustrated in FIG. 4, in each entry of the L2P table 30b, mapping representing correspondence between a logical address and a physical address of the NAND 10 is registered. In addition, each entry includes a valid flag representing whether the mapping (data) of a corresponding entry is valid or invalid. In the description presented above, while the L2P table 10b stored in the NAND 10 is loaded into the DRAM 30 in a table form, a part of the L2P table 10b stored in the NAND 10 may be loaded into the DRAM 30 in a cache form. In such a case, in the DRAM 30, an L2P cache in which a part of the L2P table 10b is cached and an L2P cache tag in which tag information used for determining a hit/miss of the L2P cache are included.

The processor 20 manages blocks included in the NAND 10 by using the block management table (not illustrated) that is one of the management information loaded into the DRAM 30. In the block management table, for example, the following block management information is managed.

the number of times of erasing (erase count) in units of blocks information used for identifying whether a block is either an active block or a free block the block address of a bad block The active block is a block in which valid data is recorded. The free block is a block, in which valid data is not recorded, that can be reused by erasing data. The valid data is data associated with a logical address, and invalid data is data not associated with a logical address. When data is written into a free block after erasing data thereof, the free block becomes an active block. The bad block is an unusable block that does not normally operate due to various reasons.

The processor 20 controls garbage collection (compaction). In the memory system 100, in a case where a data erasing unit (block) and a data reading/writing unit are different from each other, when the rewriting of data for the NAND 10 progresses, blocks are fragmented due to invalid data. When the number of such fragmented blocks increases, there is a small number of usable blocks. Thus, for example, in a case where the number of free blocks of the NAND 10 is less than a certain threshold, garbage collection is executed, whereby the number of free blocks is increased. In the garbage collection, valid data is collected from blocks (GC source blocks) in which the valid data and invalid data are included and is rewritten into a newly erased block (GC destination block). Hereinafter, the garbage collection will be abbreviated as GC.

In the memory system 100, an error correction process is executed for data stored in the NAND 10. For example, the memory I/F 24 generates parity by executing an error correction coding process for input data. The memory I/F 24 writes a code word including data and parity into the NAND 10. The memory I/F 24 executes an error correction decoding process by using a code word read from the NAND 10 and transmits decoded data to the write buffer 22.

Figure 5B:
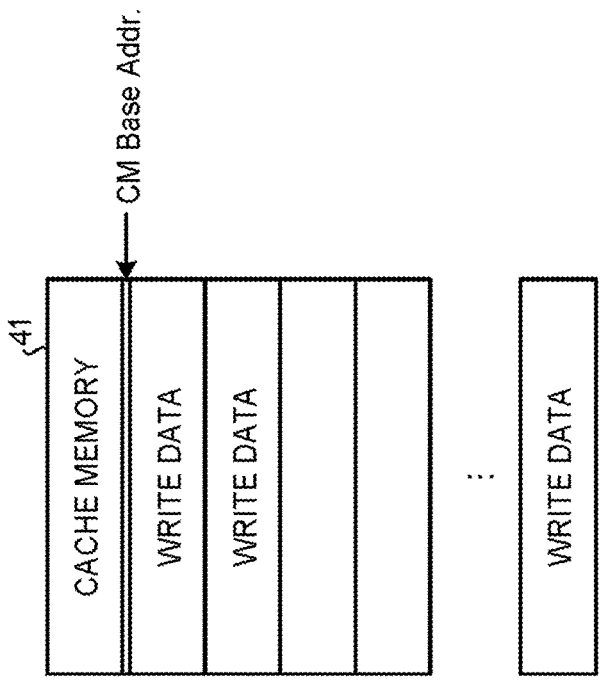
FIG. 5B is a diagram that illustrates the memory structure of cache memory.
Figure 5A:
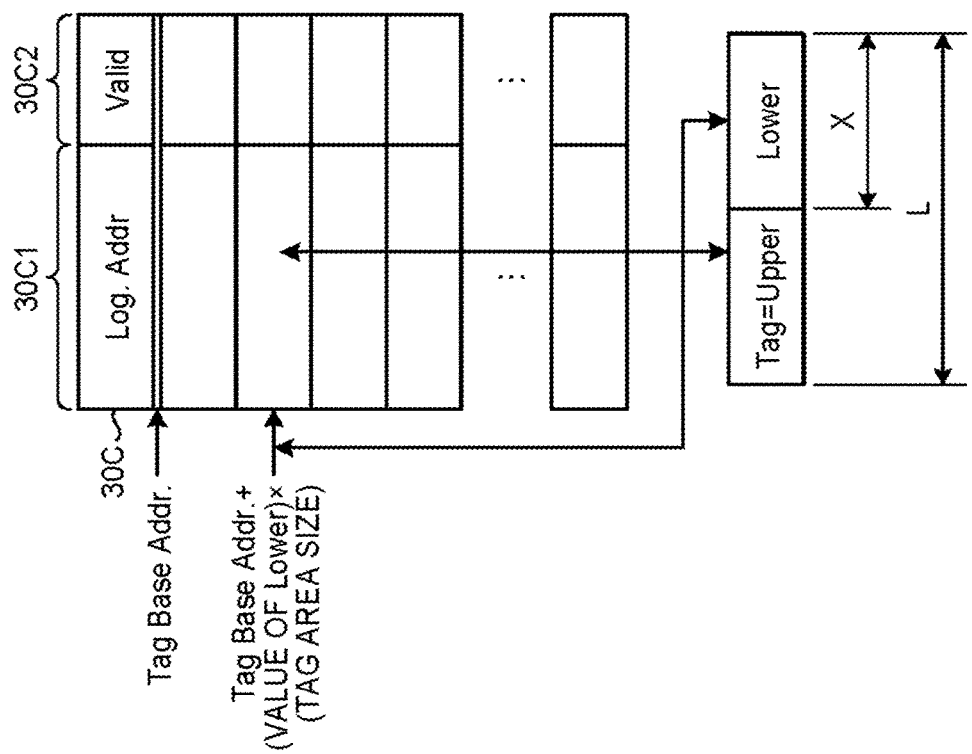
FIG. 5A is a diagram that illustrates the memory structure of a cache tag.

Next, the cache memory 41 arranged inside the MRAM 40 and the cache tag 30c of the DRAM 30 will be described with reference to FIG. 5. FIG. 5A is a diagram that illustrates the memory structure of the cache tag 30c, and FIG. 5B is a diagram that illustrates the memory structure of the cache memory 41. Here, the bit length of the LBA is assumed to be L bits. The cache memory 41 is referred to by using a value of low-order x bits of the LBA.

The cache memory 41 is configured by q, which is acquired as 2 raised to the power of x, cache lines. In each cache line, write data of a certain size is stored. The certain size, for example, is 4 K bytes. In the cache memory 41, in order of the value of low-order x bits, corresponding write data is stored. Each cache line is read by referring to an address acquired using the following equation.

Base address (CM Base Addr.) of the cache memory 41+(value of low-order x bits)×(cache line size)

As illustrated in FIG. 5A, the cache tag 30c includes q tag areas (entries) corresponding to the q cache lines configuring the cache memory 41. The q entries of the cache tag 30c correspond to the q entries of the cache memory 41 having one-to-one correspondence. Each entry includes: a field 30c1 in which a tag is stored; and a field 30c2 in which a valid bit representing whether or not the cache line is a valid cache line is stored. In the field 30c1, the high-order bits of an LBA (Log. Addr) corresponding to write data stored in a corresponding cache line of the cache memory 41 are stored. The high-order bits are bits acquired by excluding the low-order x bits from all the bits L of the LBA. The valid bit stored in the field 30c2 represents whether or not write data stored in a cache line corresponding to a tag is valid.

It is determined as follows whether or not write data corresponding to a desired LBA is cached in the cache memory 41. First, the reference address of the cache tag 30c is calculated as follows.

reference address=base address (Tag Base Addr.) of the cache tag 30c+(one tag area size)×(value of low-order x bits inside a desired LBA)

A tag stored in the calculated reference address inside the cache tag 30c is compared with the value of the high-order bits of the inside the desired LBA. Then, in the case of matching, a hit is determined, and, in the case of no-matching, a miss is determined.

In the case illustrated in FIG. 5, while a direct map system is employed, a full associative system or an N-way set associative system may be employed. In addition, in the description presented above, while a logical address of data stored inside the cache memory 41 of the MRAM 40 and a physical address of the cache memory 41 are managed in the cache system, like the L2P table, the mapping between the logical address and the physical address may be managed in a table system.

Figure 6:
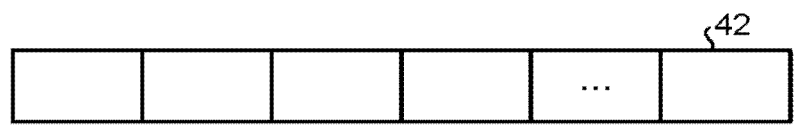
FIG. 6 is a diagram that illustrates the structure of a queue.

FIG. 6 is a diagram that illustrates an example of the configuration of the queue 42 arranged inside the MRAM 40. In the queue 42, an LBA that is a logical address of data stored in the cache memory 41 is stored. The queue 42 stores LBAs corresponding to a certain number of units of data. The number of LBAs stored in the queue 42 is less than the cache line number of the cache memory 41. When the same LBA is input to the queue 42, data of the LBA that is not latest is invalidated in the queue 42 and the cache tag 30c, and data of the latest LBA is registered.

Figure 7:
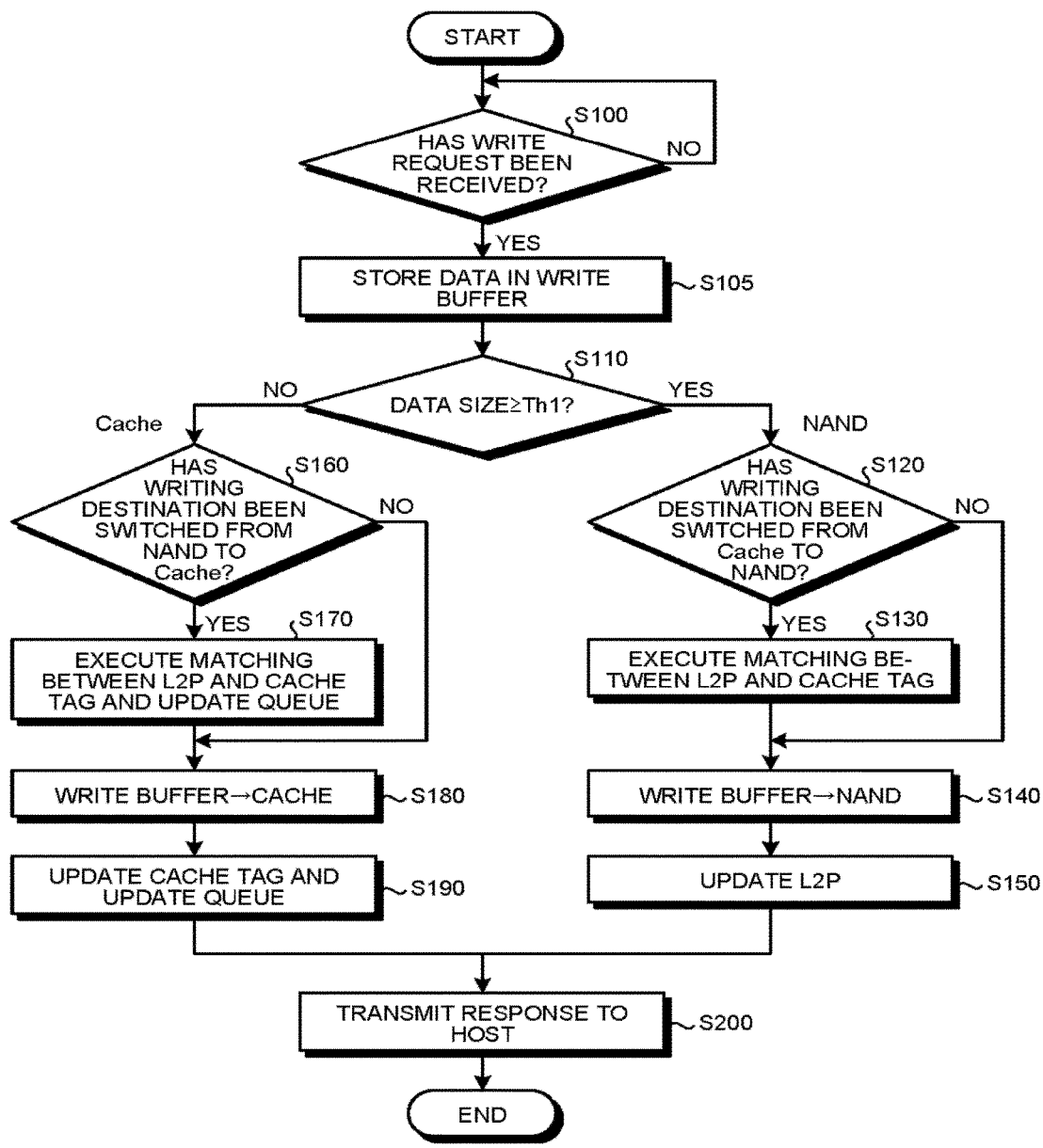
FIG. 7 is a flowchart that illustrates the operating sequence of the memory system according to the first embodiment at the time of reception of a write request.

FIG. 7 is a flowchart that illustrates an example of the operating sequence of the memory system 100 at the time of reception of a write request from the host 1. When a write command and write data are received from the host 1 (Step S100), the received write data is buffered into the write buffer 22 through the host I/F 23 (Step S105). The processor 20 determines whether or not the size of data specified by the write command is the threshold Th1 or more (Step S110). In a case where the data size is the threshold Th1 or more, the processor 20 sets the writing destination of the data to the NAND 10. Before writing the data into the NAND 10, the processor 20 determines whether or not the writing destination is changed from the cache memory 41 to the NAND 10 in accordance with the write command input this time (Step S120). In a case where there is no change in the writing destination (Step S140: No), the processor 20 reads write data from the write buffer 22 and writes the read data into the NAND 10 through the memory I/F 24 (Step S140). In accordance with this writing process, the processor 20 updates the L2P table 30b (Step S150). The case where there is no change in the writing destination, for example, is a case where the writing destinations according to the write commands of the previous time and this time are the NAND.

In a case where there is a change in the writing destination (Step S120: Yes), since the data stored in the cache memory 41 in accordance with the command of the previous time is latest, the processor 20 executes matching between the L2P table 30b and the cache tag 30c. The case where there is a change in the writing destination, for example, is a case where the writing destination of data according to a write command of the previous time is the cache memory, and the writing destination of data according to a write command of this time is the NAND 10. By comparing the LBA registered in the queue 42 with the L2P table 30b, the processor 20 determines whether or not data having the same LBA as the LBA registered in the queue 42 is stored in the NAND 10. In a case where the data having the same LBA is stored also in the NAND 10, the valid flag of the entry of the corresponding LBA in the L2P table 30b is invalidated. Thereafter, the processor 20 reads write data from the write buffer 22 and writes read data into the NAND 10 through the memory I/F 24 (Step S140). In accordance with this writing process, the processor 20 updates the L2P table 30b (Step S150).

After updating the L2P, the processor 20 transmits a response representing the end of writing of the data specified by the write command to the host 1 through the host I/F 23 (Step S200). This response to the host is made before executing matching between the L2P table updated in Step S150 and the cache tag 30c. In this way, before matching of the management information accompanied with the writing of the data specified by the write data, the response to the host 1 is transmitted, and accordingly, the host 1 can transmit a next command after the reception of this response. For this reason, a writing process having high efficiency can be executed.

In Step S110, in a case where the size of the data is less than the threshold Th1 (Step S110: No), the processor 20 sets the writing destination of the data to the cache memory 41. Before writing data into the cache memory 41, the processor 20 determines whether or not the writing destination has been changed from the NAND 10 to the cache memory 41 based on the write command input this time (Step S160). In a case where there is no change in the writing destination (Step S160: No), the processor 20 reads write data from the write buffer 22 and writes the read data into the cache memory 41 (Step S180). In accordance with this writing process, the processor 20 updates the cache tag 30c and the queue 42 (Step S190). The case where there is no change in the writing destination, for example, is a case where the writing destinations of data according to write commands of the previous time and this time are the cache memory.

In a case where there is a change in the writing destination (Step S160: Yes), the data stored in the NAND 10 in accordance with the command of the previous time is latest, and accordingly, the processor 20 executes matching between the L2P table 30b and the cache tag 30c and the queue 42. The case where there is a change in the writing destination, for example, is a case where the writing destination of data according to the write command of the previous time is the NAND 10, and the writing destination of data according to the write command of this time is the cache memory 41. By comparing the LBA registered in the queue 42 with the L2P table 30b, the processor 20 determines whether or not data having the same LBA as the LBA registered in the queue 42 is stored in the NAND 10. In a case where the data having the same LBA is stored also in the NAND 10, the valid flag of the entry of the corresponding LBA in the cache tag 30c is invalidated, and the entry of the corresponding LBA in the queue 42 is invalidated. Thereafter, the processor 20 writes write data from the write buffer 22 and writes the read data into the cache memory 41 (Step S180). In accordance with this writing process, the processor 20 updates the cache tag 30c and the queue 42 (Step S190).

After updating the cache tag 30c and the queue 42, the processor 20 transmits a response representing the end of writing of the data specified by the write command to the host 1 through the host I/F 23 (Step S200). The transmission of this response is executed before executing matching between the cache tag 30c and the queue 42 updated in Step S190 and the L2P table 30b. In this way, before matching of the management information accompanied with the writing of the data specified by the write data, the response to the host 1 is transmitted, and accordingly, the host 1 can transmit a next command after the reception of this response. For this reason, a writing process having high efficiency can be executed.

Figure 8:
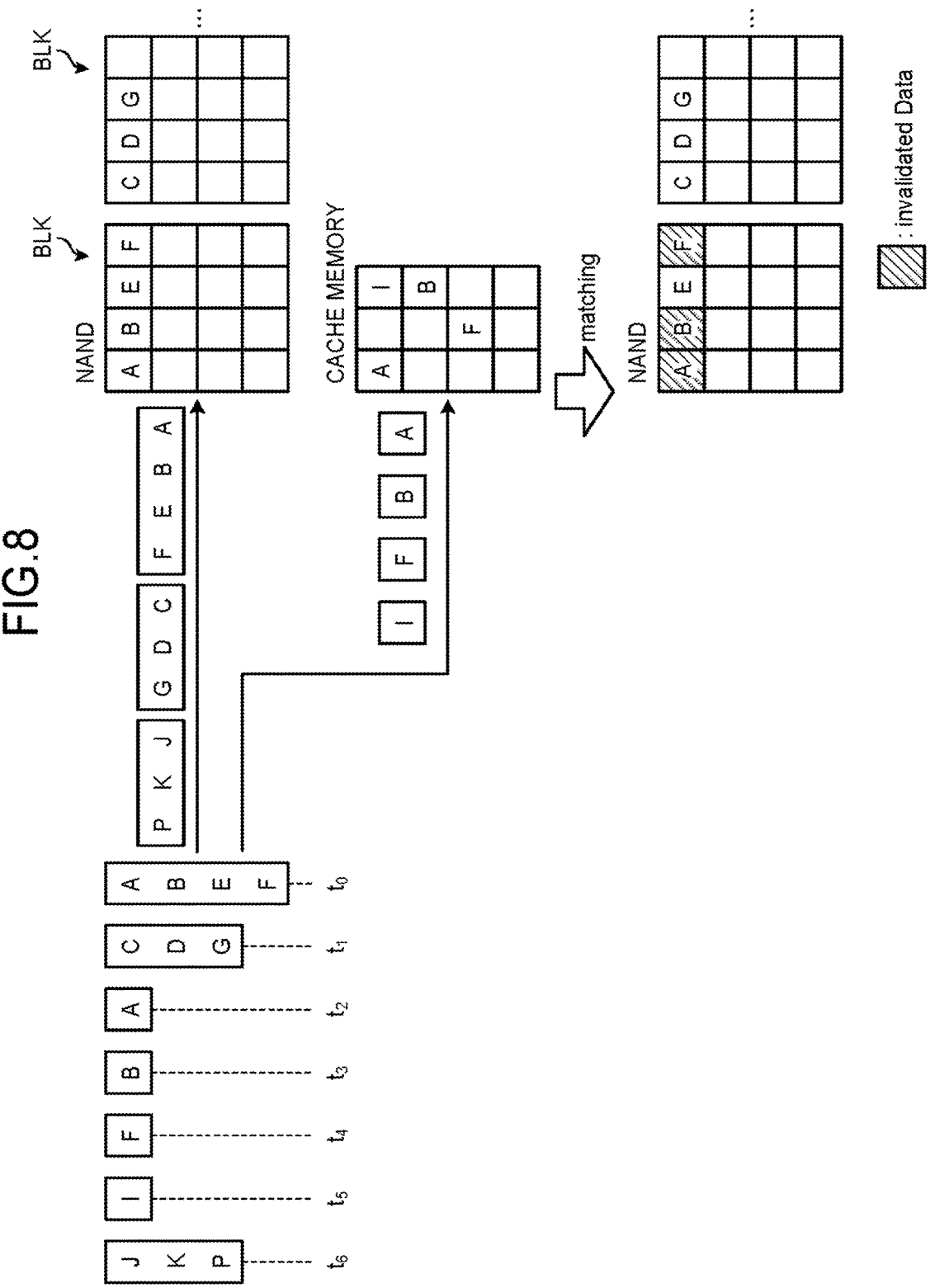
FIG. 8 is a diagram that illustrates an example of the flow of data at the time of reception of a write request and a matching process.

FIG. 8 is a diagram that illustrates an example of a writing operation. In FIG. 8 BLK represents a block. A rectangle inside a block BLK and a rectangle inside the cache memory represent data of a certain size. As illustrated on the upper drawing in FIG. 8, at time t0, a write command having data A, data B, data E, and data F as write data is received. Thereafter, at time t1, a write command having data C, data D, and data G as write data is received. Thereafter, at time t2, a write command having data A as write data is received.

Thereafter, at time t3, a write command having data B as write data is received. Thereafter, at time t4, a write command having data F as write data is received. Thereafter, at time t5, a write command having data I as write data is received. Thereafter, at time t6, a write command having data J, data K, and data P as write data is received.

The size of the write data including the data A, the data B, the data E, and the data F is assumed to be more than the threshold Th1. The size of the write data including the data C, the data D, and the data G is assumed to be more than the threshold Th1. The size of the write data including the data J, the data K, and the data P is assumed to be more than the threshold Th1. The size of the write data including the data A, the size of the write data including the data B, the size of the write data including the data F, and the size of the write data including the data I, are respectively assumed to be less than the threshold Th1.

The write data including the data A, the data B, the data E, and the data F received at time t0 is written into the NAND 10. In addition, the L2P table 30b is updated. The write data including the data C, the data D, and the data G received at time t1 is written into the NAND 10. In addition, the L2P table 30b is updated.

The writing destination of the write data including the data A received at time t2 is the cache memory 41. Since the writing destination is changed from the NAND 10 to the cache memory 41, the matching process between the L2P table 30b and the cache tag 30c and the queue 42 described above is executed. Thereafter, the write data including the data A is written into the cache memory 41, and the queue 42 is updated.

The write data including the data B received at time t3 is written into the cache memory 41. In addition, the cache tag 30c and the queue 42 are updated. The write data including the data F received at time t4 is written into the cache memory 41. In addition, the cache tag 30c and the queue 42 are updated. The write data including the data I received at time t5 is written into the cache memory 41. In addition, the cache tag 30c and the queue 42 are updated.

The writing destination of the write data including the data J, the data K, and the data P received at time t6 is the NAND 10. Since the writing destination is changed from the cache memory 41 to the NAND 10, the matching process between the L2P table 30b, the cache tag 30c, and the queue 42 is executed. As a result, as illustrated in a lower diagram in FIG. 8, the data A, the data B, and the data F stored in the NAND are invalidated. In other words, in the L2P table 30b, the data A, the data B, and the data F are invalidated. Hatched data represents invalided data.

Figure 9:
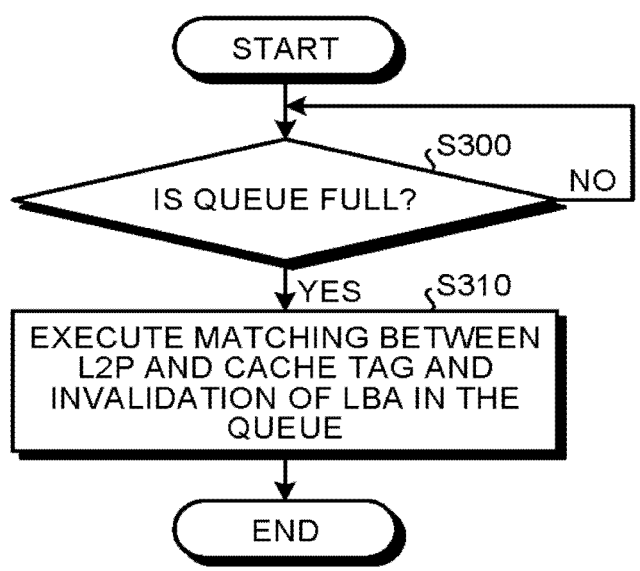
FIG. 9 is a flowchart that illustrates an example of a condition for generating the matching process.

FIG. 9 is a flowchart that illustrates an example of another timing at which matching between the L2P table 30b and the cache tag 30c is executed. When the queue 42 is full of data (LBA) (Step S300), the processor 20 executes invalidation of data (LBA) in the queue 42 and matching between the L2P table 30b and the cache tag 30c (Step S310). In a case of where the queue 42 is full of data (LBA), the data stored in the cache memory 41 (queue 42) according to the write command of this time is newer than the data stored in the NAND 10. Accordingly, when the queue 42 is full of data (LBA), the processor 20 checks whether the LBA in the queue 42 is the same with the LBA in the L2P table 30b. In a case of where there is no same LBA in the queue 42 and the L2P table 30b, the processor 20 invalidates the LBAs stored in the queue 42. In a case of where there is same LBA in the queue 42 and the L2P table 30b, the processor 20 invalidates the valid flag of the entry of the LBA in the L2P table 30b that is the same with the LBA in the queue 42, and invalidates the LBAs stored in the queue 42. In addition, when the number of LBAs stored in the queue 42 is more than a certain threshold, the matching process described above may be executed.

As described above, when a certain flush condition such as the cache memory 41 being full of data is satisfied, the flush process described above is executed. After this flush process, the update of the L2P table 30b, the update of the cache tag 30c, and the clearing of the queue 42 are executed.

In addition, when the memory system 100 does not execute a process (a writing process, a reading process, or the like) based on a command transmitted from the host 1, the matching between the L2P table 30b and the cache tag 30c and the queue 42 may be executed.

Figure 10:
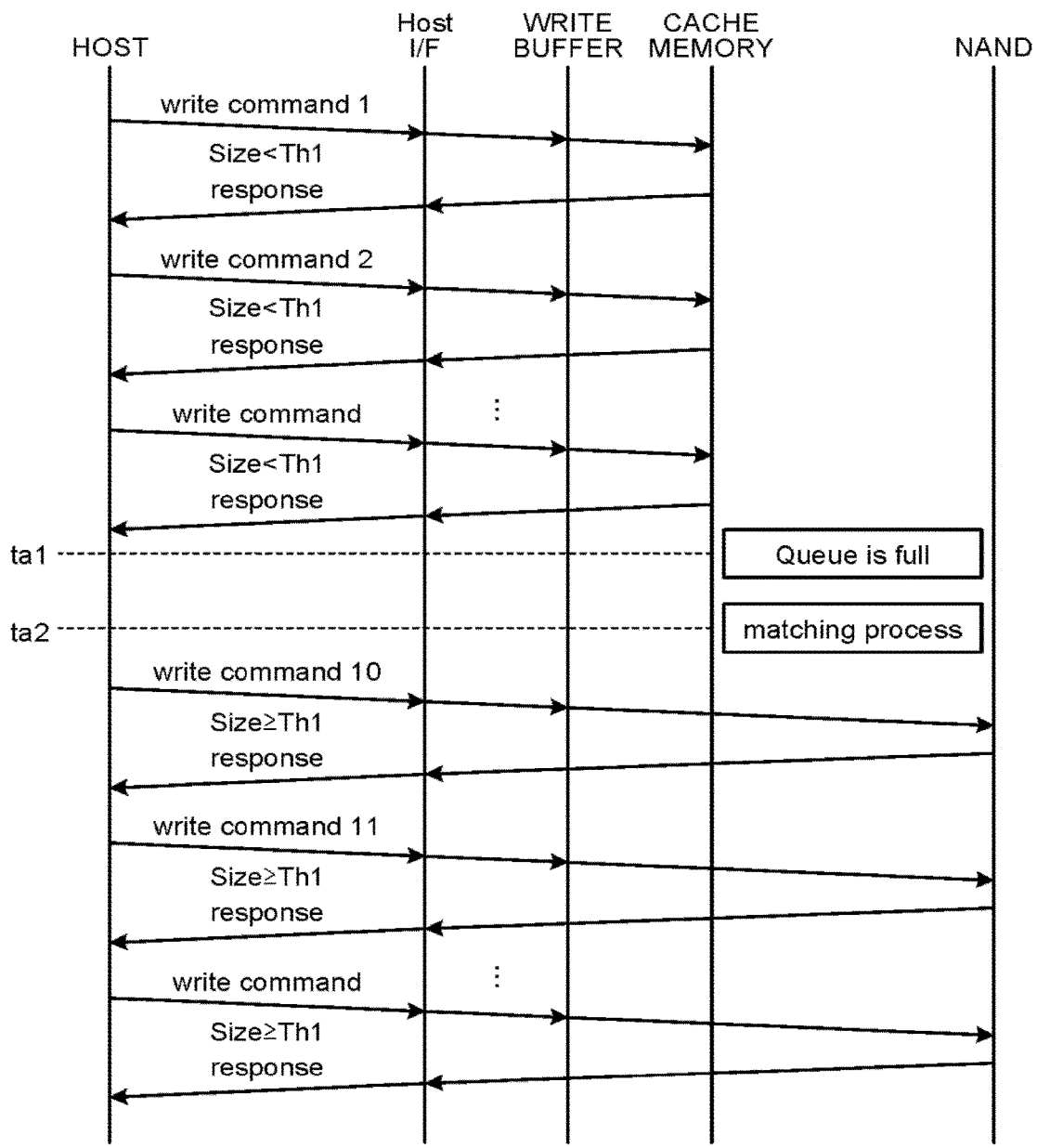
FIG. 10 is a diagram that illustrates the operating sequence of a host and a memory system.

FIG. 10 is a diagram that illustrates the operating sequence of the host 1 and the memory system 100. An upper diagram in FIG. 10 illustrates a state in which write commands including data of which the size is less than the threshold Th1 are consecutively received. Data received according to a write command 1 is stored in the cache memory 41 through the write buffer 22. Next, the cache tag 30c and the queue 42 are updated, and thereafter, a response representing the end of the writing process is transmitted to the host. A process similar thereto is executed for a write command 2 and the like. In such a case, since data having a small size is consecutively received, the writing destination of the data is fixed to the cache memory 41. For this reason, in this case, thereafter, the matching process is not executed until the queue 42 becomes full. In the sequence illustrated in FIG. 10, the queue 42 becomes full at time ta1, and the matching process is executed at time ta2. In case of random writing, there are many cases where the process of writing data of which the data size is less than the threshold Th1 is continuous.

A lower diagram in FIG. 10 illustrates a state in which write commands each including data of which the data size is the threshold Th1 or more are consecutively received. Data received according to the write command 10 is stored in the NAND 10 through the write buffer 22. Next, the L2P table 30b is updated, and thereafter, a response representing the end of the writing process is transmitted to the host. A process similar thereto is executed for a write command 11 and the like. In such a case, since write data having a large size is consecutively received, the writing destination of the data is fixed to the NAND 10. In case of sequential writing, there are many cases where the process of writing data of which the data size is the threshold Th1 or more is continuous.

In this way, in the memory system according to the first embodiment, write data is written into one of the cache memory 41 and the NAND 10. In the first embodiment, before the matching process relating to data specified by a received write command is executed, a response is transmitted to the host 1. For this reason, after the reception of this response, the host 1 can transmit a next command. Accordingly, a writing process having efficiency higher than a case where a response is transmitted to the host 1 after the execution of the matching process relating to the data specified by a received write command can be executed. Particularly, as illustrated in FIG. 10, in a case where write commands each including data of which the size is less than the threshold Th1 is consecutive, or write commands each including data of which the size is the threshold Th1 or more are consecutive, the switching between the writing destinations is not executed, and accordingly, the matching process is not executed. For this reason, a writing process having higher efficiency can be executed.

Second Embodiment

Figure 11:
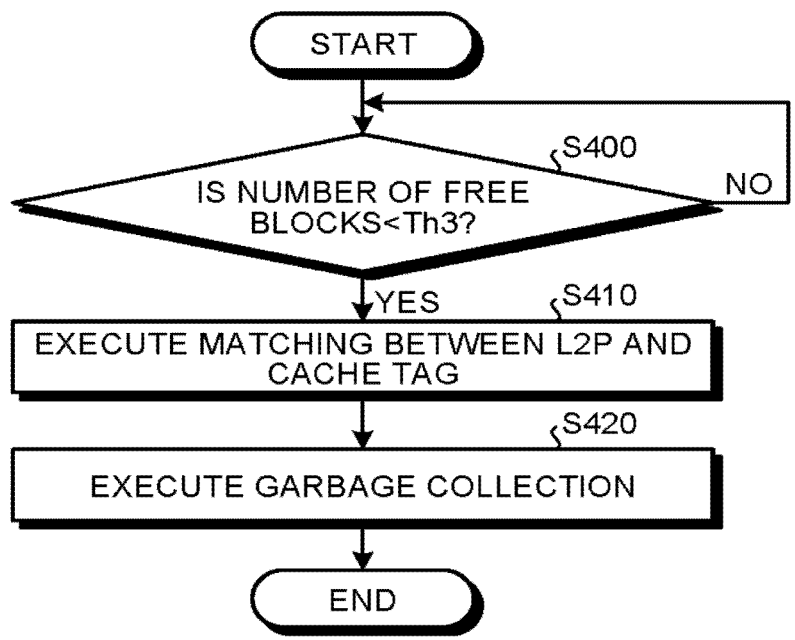
FIG. 11 is a flowchart that illustrates the processing sequence at the time of executing garbage collection.

Next, a second embodiment will be described. A memory system 100 according to the second embodiment is similar to the memory system 100 according to the first embodiment illustrated in FIG. 1, and the same reference numeral is assigned to a constituent element having the same function as the constituent element described above, and duplicate description will not be presented. A plurality of constituent elements to which the same reference numeral is assigned do not need to have all the functions and characteristics that are common but may have different functions and characteristics according to the embodiments. In the second embodiment, different from the first embodiment, before the execution of GC, the matching process is executed, and data stored inside the NAND 10 that is not latest is invalidated. FIG. 11 is a flowchart that illustrates the operating sequence of a processor 20 at the time of execution of the GC. For example, in a case where the number of free blocks is less than a certain threshold Th3 (Step S400: Yes), the processor 20 triggers the execution of the GC. Before the execution of the GC, the processor 20 executes matching between the L2P table 30b and the cache tag 30c and the queue 42 (Step S410).

By comparing the LBA registered in the queue 42 with the L2P table 30b, the processor 20 determines whether or not data having the same LBA as the LBA registered in the queue 42 is stored in the NAND 10. In a case where the data having the same LBA is stored also in the NAND 10, the valid flag of the entry of the corresponding LBA in the L2P table 30b is invalidated. When such a matching process is completed, the processor 20 executes the GC described above (Step S420). In a case where the GC is executed, free blocks can be efficiently generated by collecting valid data from blocks including more invalid data.

In this way, in the second embodiment, before the execution of the GC, data stored inside the NAND 10 that is not latest is invalidate, and the GC having no unnecessary moving of data and high efficiency can be executed.

In the embodiment described above, every time when the writing destination of data is switched from the NAND 10 to the cache memory 41 or from the cache memory 41 to the NAND 10, the matching process described above is executed, whereby data management for invalidating data that is not latest is executed. However, by including a time stamp in the management information of data, the latest data may be managed.

Third Embodiment

Next, a third embodiment will be described. A memory system 100 according to the third embodiment is similar to the memory system 100 according to the first embodiment illustrated in FIG. 1, and the same reference numeral as that of the constituent element of the present technology is assigned to a constituent element having the same function as the constituent element described above, and duplicate description will not be presented. A plurality of constituent elements to which the same reference numeral is assigned do not need to have all the functions and characteristics that are common but may have different functions and characteristics according to the embodiments.

Figure 12:
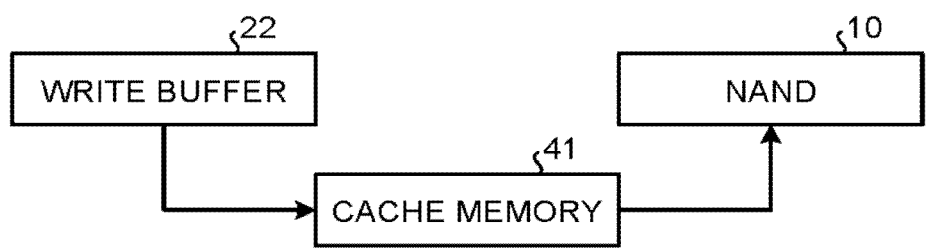
FIG. 12 is a diagram that illustrates the flow of data at the time of reception of a write request inside a memory system according to a third embodiment.

FIG. 12 is a diagram that illustrates the flow of data at the time of reception of a write request in the third embodiment. When a write request is received from the host 1, the processor 20 buffers write data in the write buffer 22. For example, when the write buffer 22 is full, the processor 20 reads data stored in the write buffer 22 and writes read data into the cache memory 41 of the MRAM 40. When the certain flush condition described above such as the cache memory 41 being full of data is satisfied, the processor 20 writes data stored in the cache memory 41 into the NAND 10.

In the third embodiment, when data of the same LBA is stored in the NAND 10 and the cache memory 41, data that is stored in the cache memory 41 is latest data all the time. Also in the third embodiment, when the queue 42 is full of data (LBA), the processor 20 executes matching between the L2P table 30b and the cache tag 30c described above and updates the L2P table 30b in accordance with the cache tag 30c. The processor 20 invalidates an LBA in the queue 42, for example, by removing the LBA from the queue 42. The LBA invalidated in the queue 42 is the same as the LBA invalidated in the L2P table 30b.

Figure 13:
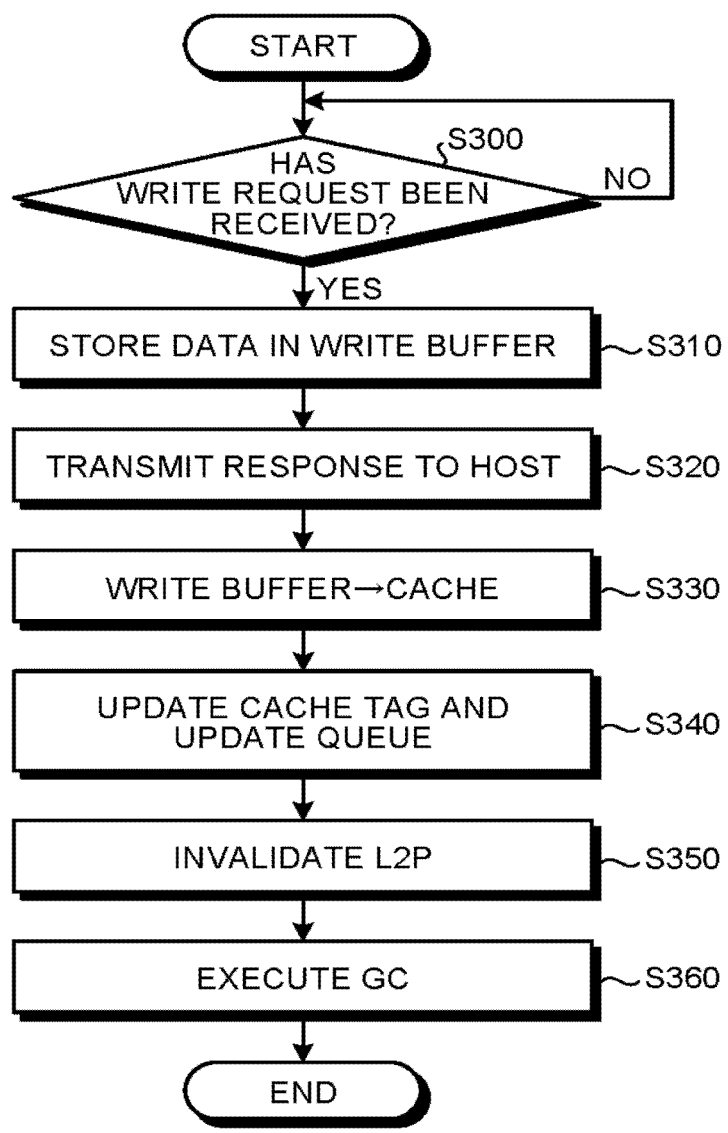
FIG. 13 is a flowchart that illustrates the operating sequence of the memory system according to the third embodiment at the time of reception of a write request.

FIG. 13 is a flowchart that illustrates an example of the operating sequence of the memory system 100 according to the third embodiment at the time of reception of a write command from the host 1. When the write command and write data are received from the host 1 (Step S300), the received write data is buffered in the write buffer 22 through the host I/F 23 (Step S310). When the write data is buffered in the write buffer 22, the processor 20 transmits a response representing the end of writing of data specified by the write command to the host 1 through the host I/F 23 (Step S320).

Next, the processor 20 reads write data from the write buffer 22 and writes read data into the cache memory 41 (Step S330). In accordance with this writing process, the processor 20 updates the cache tag 30c and the queue 42 (Step S340).

Thereafter, by comparing the LBA registered in the queue 42 with the L2P table 30b, the processor 20 determines whether or not data having the same LBA as the LBA registered in the queue 42 is stored in the NAND 10. In a case where the data having the same LBA is stored also in the NAND 10, the valid flag of the entry of the corresponding LBA in the L2P table 30b is invalidated (Step S350). When such an invalidating process is completed, the processor 20 executes the GC described above (Step S360).

According to the third embodiment, when write data is written into the write buffer, a response corresponding to a write command is transmitted to the host. For this reason, after the reception of this response, the host 1 can transmit a next command. Accordingly, a writing process having high efficiency can be executed. In addition, before the execution of the GC, data stored in the NAND 10 that is not latest is invalidated, and accordingly, the GC having no unnecessary data moving and high efficiency can be executed.

Fourth Embodiment

Next, a fourth embodiment will be described. A memory system 100 according to the fourth embodiment is similar to the memory system 100 according to the first embodiment illustrated in FIG. 1, and the same reference numeral is assigned to a constituent element having the same function as the constituent element described above, and duplicate description will not be presented. A plurality of constituent elements to which the same reference numeral is assigned do not need to have all the functions and characteristics that are common but may have different functions and characteristics according to the embodiments.

In the memory system according to the fourth embodiment, at the time of reception of a write request, the data flows as illustrated in FIG. 12. In other words, in a case where a write request is received from the host 1, the processor 20 buffers write data in the write buffer 22. For example, when the write buffer 22 is full, the processor 20 reads data stored in the write buffer 22 and writes the read data into the cache memory 41 of the MRAM 40. When the certain flush condition described above such as the cache memory 41 being full of data is satisfied, the processor 20 writes data stored in the cache memory 41 into the NAND 10.

In the fourth embodiment, when data of the same LBA is stored in the NAND 10 and the cache memory 41, data that is stored in the cache memory 41 is latest data all the time. Also in the fourth embodiment, when the queue 42 is full of data (LBA), the processor 20 executes matching between the L2P table 30b and the cache tag 30c described above and updates the L2P table 30b in accordance with the cache tag 30c. The processor 20 invalidates an LBA in the queue 42, for example, by removing the LBA from the queue 42. The LBA invalidated in the queue 42 is the same as the LBA invalidated in the L2P table 30b.

Figure 14:
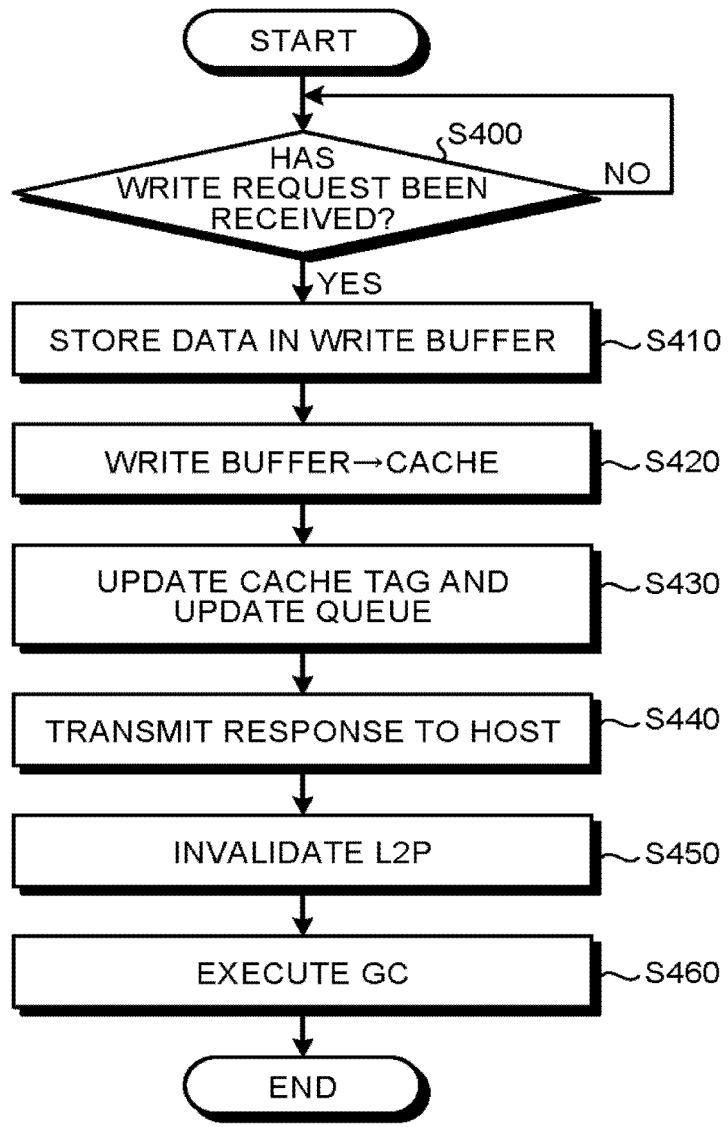
FIG. 14 is a flowchart that illustrates the operating sequence of a memory system according to a fourth embodiment at the time of reception of a write request.

FIG. 14 is a flowchart that illustrates an example of the operating sequence of the memory system 100 according to the fourth embodiment at the time of reception of a write command from the host 1. When the write command and write data are received from the host 1 (Step S400), the received write data is buffered in the write buffer 22 through the host I/F 23 (Step S410). Next, the processor 20 reads the write data from the write buffer 22 and writes the read data into the cache memory 41 (Step S420). In accordance with this writing process, the processor 20 updates the cache tag 30c and the queue 42 (Step 0430).

When the update of the cache tag 30c and the queue 42 is completed, the processor 20 transmits a response representing the end of writing of data specified by the write command to the host 1 through the host I/F 23 (Step S440).

Thereafter, by comparing the LBA registered in the queue 42 with the L2P table 30b, the processor 20 determines whether or not data having the same LBA as the LBA registered in the queue 42 is stored in the NAND 10. In a case where the data having the same LBA is stored also in the NAND 10, the valid flag of the entry of the corresponding LBA in the L2P table 30b is invalidated (Step S450). When such an invalidating process is completed, the processor 20 executes the GC described above (Step S460).

According to the fourth embodiment, when the update of the cache tag 30c and the queue 42 is completed, a response corresponding to a write command is transmitted to the host. For this reason, after the reception of this response, the host 1 can transmit a next command. Accordingly, a writing process having high efficiency can be executed. In addition, before the execution of the GC, data stored in the NAND 10 that is not latest is invalidated, and accordingly, the GC having no unnecessary data moving and high efficiency can be executed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a first nonvolatile memory;
   a second nonvolatile memory having less storage capacity and a smaller latency than the first nonvolatile memory;
   a first table that stores first management information representing a correspondence relation between logical addresses of data stored in the first nonvolatile memory and physical addresses of the first nonvolatile memory;
   a second table that stores second management information representing a correspondence relation between logical addresses of data stored in the second nonvolatile memory and physical addresses of the second nonvolatile memory; and
   a controller configured to
      in response to a first write request from the host, store first data into the first nonvolatile memory or the second nonvolatile memory, the first data being specified by the first write request,
      in response to a second write request from the host, the second request being a write request that is next after the first write request,
         in a case where a size of the first data specified by the first write request is more than or equal to a first threshold and a size of second data specified by the second write request is less than the first threshold, store the second data into the second nonvolatile memory, execute a first matching process, the first matching process including comparing the logical addresses included in the second management information with the logical addresses included in the first management information and invalidating a correspondence relation of a first logical address in the second management information that matches one of the logical addresses in the first management information, update the second management information of the second table by third management information after executing the first matching process, and transmit a response to the second write request to the host, the third management information representing a correspondence relation between a logical address of the second data and a physical address of the second nonvolatile memory in which the second data is stored,
         in a case where the size of the first data is less than the first threshold and the size of the second data is less than the first threshold, store the second data into the second nonvolatile memory, update the second management information of the second table by the third management information without comparing the logical addresses included in the second management information with the logical addresses included in the first management information, and transmit the response to the second write request to the host,
         in a case where the size of the first data is less than the first threshold and the size of the second data is more than or equal to the first threshold, store the second data into the first nonvolatile memory, execute a second matching process, the second matching process including comparing the logical addresses included in the first management information with the logical addresses included in the second management information and invalidating a correspondence relation of a second logical address in the first management information that matches one of the logical addresses in the second management information, update the first management information of the first table by the third management information after executing the second matching process, and transmit the response to the second write request to the host, and in a case where the size of the first data is more than or equal to the first threshold and the size of the second data is more than or equal to the first threshold, store the second data into the first nonvolatile memory, update the first management information of the first table by the third management information without comparing the logical addresses included in the second management information with the logical addresses included in the first management information, and transmit the response to the second write request to the host.

2. The memory system according to claim 1, wherein, in the case where the size of the first data is less than the first threshold, the controller stores the first data into the second nonvolatile memory, and in the case where the size of the first data is more than or equal to the first threshold, the controller stores the first data into the first nonvolatile memory.

3. The memory system according to claim 1, wherein the controller executes the first matching process or the second matching process when a number of certain units of data stored in the second nonvolatile memory exceeds a second threshold.

4. The memory system according to claim 3, wherein, when the number of certain units of data stored in the second nonvolatile memory exceeds the second threshold, the controller reads the data stored in the second nonvolatile memory and writes the read data into the first nonvolatile memory.

5. The memory system according to claim 1, further comprising a queue including a storage area in which a certain number of logical addresses of data stored in the second nonvolatile memory can be stored, wherein the controller executes the first matching process or the second matching process when a number of the logical addresses stored in the storage area of the queue exceeds a third threshold.

6. The memory system according to claim 5, after the first matching process or the second matching process is executed, when the number of the logical addresses stored in the storage area of the queue exceeds the third threshold, the controller reads the data stored in the second nonvolatile memory and writes the read data into the first nonvolatile memory.

7. The memory system according to claim 1, wherein the first nonvolatile memory includes a plurality of blocks, each of the plurality of blocks being a unit of data erasing, and wherein the controller executes the first matching process or the second matching process before executing a first processing, the first processing including reading valid data from a plurality of first blocks including valid data and invalid data among the plurality of blocks and writing the read valid data into an erased second block that is different from the first blocks.

8. The memory system according to claim 1, wherein the first nonvolatile memory is NAND type flash memory, and the second nonvolatile memory is MRAM.

9. A method of controlling a first nonvolatile memory and a second nonvolatile memory, the second nonvolatile memory having less storage capacity and a smaller latency than the first nonvolatile memory, the method comprising:

storing first management information representing a correspondence relation between logical addresses of data stored in the first nonvolatile memory and physical addresses of the first nonvolatile memory into a first table;

storing second management information representing a correspondence relation between logical addresses of data stored in the second nonvolatile memory and physical addresses of the second nonvolatile memory into a second table;

in response to a first write request from a host, storing first data into the first nonvolatile memory or the second nonvolatile memory, the first data being specified by the first write request; and in response to a second write request from the host, the second request being a write request that is next after the first write request, in a case where a size of the first data specified by the first write request is more than or equal to a first threshold and a size of second data specified by the second write request is less than the first threshold, storing the second data into the second nonvolatile memory, executing a first matching process, the first matching process including comparing the logical addresses included in the second management information with the logical addresses included in the first management information and invalidating a correspondence relation of a first logical address in the second management information that matches one of the logical addresses in the first management information, updating the second management information of the second table by third management information after executing the first matching process, and transmitting a response to the second write request to the host, the third management information representing a correspondence relation between a logical address of the second data and a physical address of the second nonvolatile memory in which the second data is stored, in a case where the size of the first data is less than the first threshold and the size of the second data is less than the first threshold, storing the second data into the second nonvolatile memory, updating the second management information of the second table by the third management information without comparing the logical addresses included in the second management information with the logical addresses included in the first management information, and transmitting the response to the second write request to the host, in a case where the size of the first data is less than the first threshold and the size of the second data is more than or equal to the first threshold, storing the second data into the first nonvolatile memory, executing a second matching process, the second matching process including comparing the logical addresses included in the first management information with the logical addresses included in the second management information and invalidating a correspondence relation of a second logical address in the first management information that matches one of the logical addresses in the second management information, updating the first management information of the first table by the third management information after executing the second matching process, and transmitting the response to the second write request to the host, and in a case where the size of the first data is more than or equal to the first threshold and the size of the second data is more than or equal to the first threshold, storing the second data into the first nonvolatile memory, updating the first management information of the first table by the third management information without comparing the logical addresses included in the second management information with the logical addresses included in the first management information, and transmitting the response to the second write request to the host.

10. The method according to claim 9, further comprising,
in the case where the size of the first data is less than the first threshold, storing the first data into the second nonvolatile memory, and
in the case where the size of the first data is more than the first threshold, storing the first data into the first nonvolatile memory.

11. The method according to claim 9, further comprising executing the first matching process or the second matching process when a number of certain units of data stored in the second nonvolatile memory exceeds a second threshold.

12. The method according to claim 11, further comprising,
when the number of certain units of data stored in the second nonvolatile memory exceeds the second threshold, reading the data stored in the second nonvolatile memory and writing the read data into the first nonvolatile memory.

13. The method according to claim 9, further comprising executing the first matching process or the second matching process when a number of the logical addresses stored in a storage area of a queue exceeds a third threshold, the queue including the storage area in which a certain number of logical addresses of data stored in the second nonvolatile memory can be stored.

14. The method according to claim 13, further comprising,
after the first matching process or the second matching process is executed, when the number of the logical addresses stored in the storage area of the queue exceeds the third threshold, reading the data stored in the second nonvolatile memory and writing the read data into the first nonvolatile memory.

15. The method according to claim 9, wherein the first nonvolatile memory includes a plurality of blocks, each of the plurality of blocks being a unit of data erasing, and the method further comprising
executing the first matching process or the second matching process before executing a first processing, the first processing including reading valid data from a plurality of first blocks including valid data and invalid data among the plurality of blocks and writing the read valid data into an erased second block that is different from the first blocks.

16. The method according to claim 9, wherein the first nonvolatile memory is NAND type flash memory, and the second nonvolatile memory is MRAM.

* * * * *